United States Patent [19]

Worrallo

[11] Patent Number: 4,989,332
[45] Date of Patent: Feb. 5, 1991

[54] MEASURING APPARATUS

[76] Inventor: Anthony C. Worrallo, 77 Beaconsfield Road, Blackheath, London SE3 7LG, England

[21] Appl. No.: 355,501

[22] Filed: May 23, 1989

[30] Foreign Application Priority Data

May 25, 1988 [GB] United Kingdom ............... 8812407

[51] Int. Cl.⁵ .................................................. G01B 19/62
[52] U.S. Cl. ......................................... 33/342; 33/451; 33/376
[58] Field of Search ............... 33/485, 451, 486, 487, 33/488, 489, 483, 484, 374, 375, 376, 342, 379, 384, 354, 809, DIG. 1

[56] References Cited

U.S. PATENT DOCUMENTS

| | | | |
|---|---|---|---|
| 566,195 | 8/1896 | Leavitt | 33/485 |
| 591,804 | 10/1897 | Barrie | 33/485 X |
| 1,489,572 | 4/1924 | Bennewitz | 33/376 |
| 2,230,010 | 1/1941 | Owens | 33/489 |
| 3,311,988 | 4/1967 | Manville | 33/376 X |
| 4,152,838 | 5/1979 | Cook | 33/374 X |
| 4,399,616 | 8/1983 | Jansson | 33/809 |
| 4,660,292 | 4/1987 | Richardson | 33/451 |

FOREIGN PATENT DOCUMENTS

| | | |
|---|---|---|
| 0013683 | 8/1980 | European Pat. Off. |
| 960931 | 3/1957 | Fed. Rep. of Germany |
| 3106176 | 9/1982 | Fed. Rep. of Germany |
| 1145271 | 8/1976 | United Kingdom ............ 33/379 |

Primary Examiner—Harry N. Haroian
Attorney, Agent, or Firm—Roylance, Abrams, Berdo & Goodman

[57] ABSTRACT

Measuring apparatus having at least one measuring scale for effecting measurements, a straight edge for marking straight lines, a spirit level for testing for horizontality, and a friction-creating device for providing a grip for the measuring apparatus on a surface against which the measuring apparatus is to be used.

8 Claims, 5 Drawing Sheets

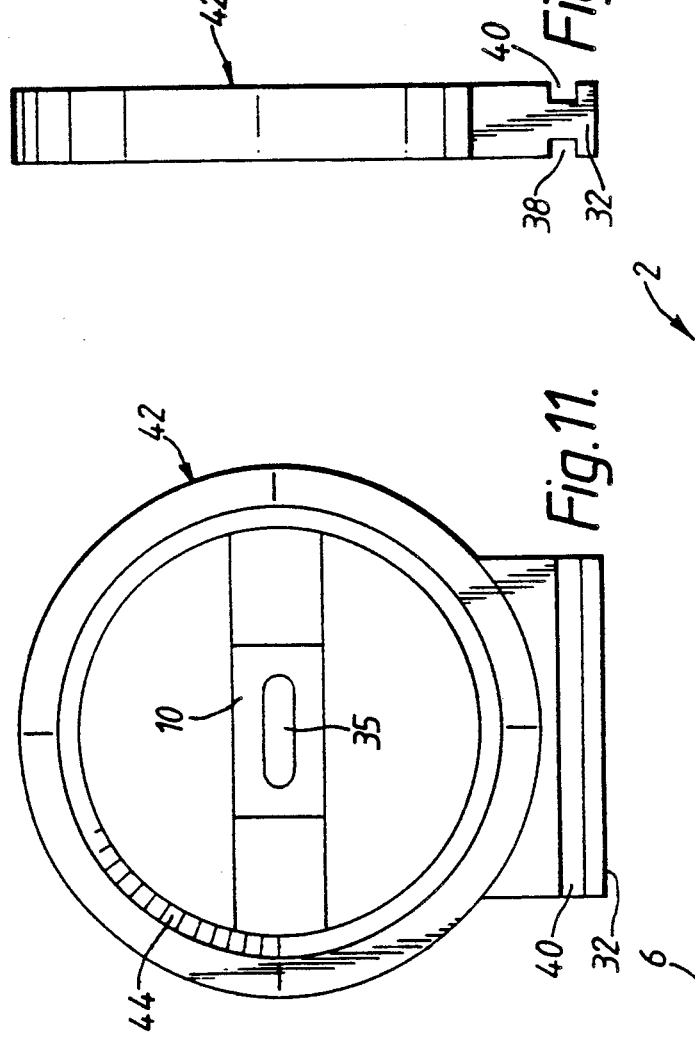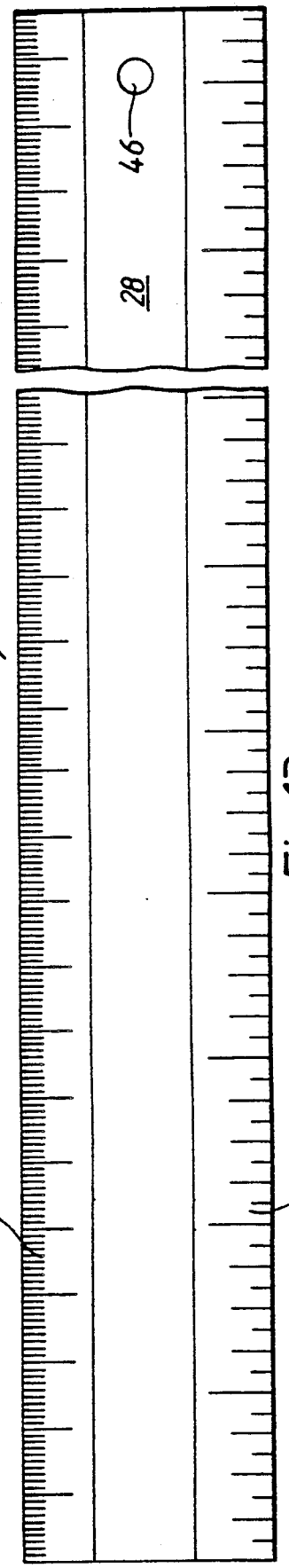

MEASURING APPARATUS

This invention relates to measuring apparatus and it relates more especially to measuring apparatus having at least one measuring scale and a spirit level.

Measuring apparatus having a measuring scale and a spirit level is known. However, such measuring apparatus is difficult to hold in position against surfaces such for example as walls, and the known measuring apparatus is complex and costly to manufacture.

It is an aim of the present invention to reduce the above mentioned problems.

Accordingly, this invention provides measuring apparatus comprising in combination:
(a) a first side from which measurements are effected;
(b) a second side for engaging a surface to be measured;
(c) at least one measuring scale which is provided on the first side and which is for effecting measurements;
(d) a straight edge for marking lines;
(e) a first channel which is open along the second side and which extends the entire length of the measuring apparatus;
(f) a friction-creating strip of resilient material which is positioned in the first channel and which is positioned in the first channel and which is for providing a grip for the measuring apparatus on the surface to be measured;
(g) a second channel which is open along the first side and which extends the entire length of the measuring apparatus; and
(h) a spirit level which is positioned in the second channel and which is for testing for horizontality, the spirit level being substantially shorter than the length of the second channel so that the second channel is also available for accepting writing instruments.

The second channel with its facility to accept writing instruments such as pencils or pens is very useful when working with the measuring apparatus on a vertical surface such as a wall. Often the measuring apparatus will need to be adjusted with two hands or the measuring apparatus will need to be held in one hand and another object will need to be held in the other hand. One or more writing instruments or other appropriately sized tools can be located in the second channel and they are thus immediately ready and visible for the purpose of making appropriate marks.

The measuring apparatus may include a third channel which is open along the second side and which extends the entire length of the measuring apparatus, and an extension rule which is positioned in the third channel.

Preferably, the extension rule has at least two measuring scales, the two measuring scales being in the same measuring denomination, the two measuring scales each starting from a different end of the extension rule, and the two measuring scales starting at a zero reading at the ends of the extension rule and extending inwards for measurements whereby the extension rule can be used from either end of the measuring apparatus. The extension rule can thus advantageously and easily be used for effecting further measurements, for example in awkward places.

The extension rule will usually be made to be rigid but it may be made to be flexible if desired.

The measuring apparatus may include a fourth channel and a cursor in the fourth channel, the fourth channel being such that it is adjacent the second channel but is open along an edge of the measuring apparatus. Preferably, there are two of the cursors.

The cursor or cursors may advantageously be used for finding an equivalent measurement in one measuring denomination when a measurement has been effected in another measuring denomination. For example, where the measuring apparatus is provided with two measuring scales for effecting measurement and these two measuring scales are in different measuring denominations, one measuring scale may be, for example, a metric scale whilst the other measuring scale may be, for example, an imperial scale. Thus, with the use of the cursor or cursors, measurements made in millimetres or centimetres can easily be translated into equivalent measurements in inches or feet. The use of two cursors may also be advantageous in marking two places which are horizontal on a wall or other surface, for example for the purposes of hanging objects such as pictures, cupboards or shelves.

Preferably, the measuring apparatus has an extruded body portion when the measuring apparatus includes the first, second, third and fourth channels, then these channels may all be formed in the extruded body portion.

The measuring apparatus may be one in which the extruded body portion is made of aluminium, and in which the measuring scale is printed on the body portion. The extruded body portion may be made of metals other than aluminium but aluminium is preferred since it is both rigid and light. The body portion may be made non-metallic materials such for example as plastics materials. However with plastics materials, the body portion may be less rigid and somewhat flexible and workmen may prefer a more rigid construction. As an alternative to printing the measuring scale on the body portion, the measuring scale may be stuck on the body portion or it may be provided on a separate element which slidingly engages or clips to the body portion.

The measuring apparatus may include a hole at one end of the body portion, the hole enabling the measuring apparatus to be hung when not in use and also to be hung against the surface to be measured for vertical plumb measuring.

The measuring appartus of the present invention can be produced at relatively low cost and it is able to afford a number of essential and useful functions as mentioned above. Thus the measuring apparatus of the present invention may be especially useful both to persons wishing to effect their own jobs, and also to professional persons such for example as building workers, carpenters and painters. The measuring apparatus can be used on a wide variety of flat surfaces such for example as desk tops and walls. Irrespective of whether the working surface is horizontal, inclined or vertical, the friction-creating means operates to give good grip. A good grip is especially appreciated when the measuring apparatus is held in one hand and a line is being drawn along the straight edge, or a cut is being effected with a knife or other instrument along the straight edge. In such circumstances, slipping of the measuring apparatus would be extremely frustrating to an operator and the friction-creating means helps to prevent this slipping.

The measuring apparatus can be made in various sizes. For example, the measuring apparatus can be made to be one metre long, but longer or shorter measuring apparatus can be produced.

Embodiments of the invention will now be described solely by way of example and with reference to the accompanying drawings in which:

FIG. 11 shows an angular member which may be slid into the measuring apparatus to form part of the measuring apparatus;

FIG. 12 is an end view of the angular member shown in FIG. 11;

FIG. 13 is a top plan view of the measuring apparatus and illustrates two types of measuring scales;

Figure 1:
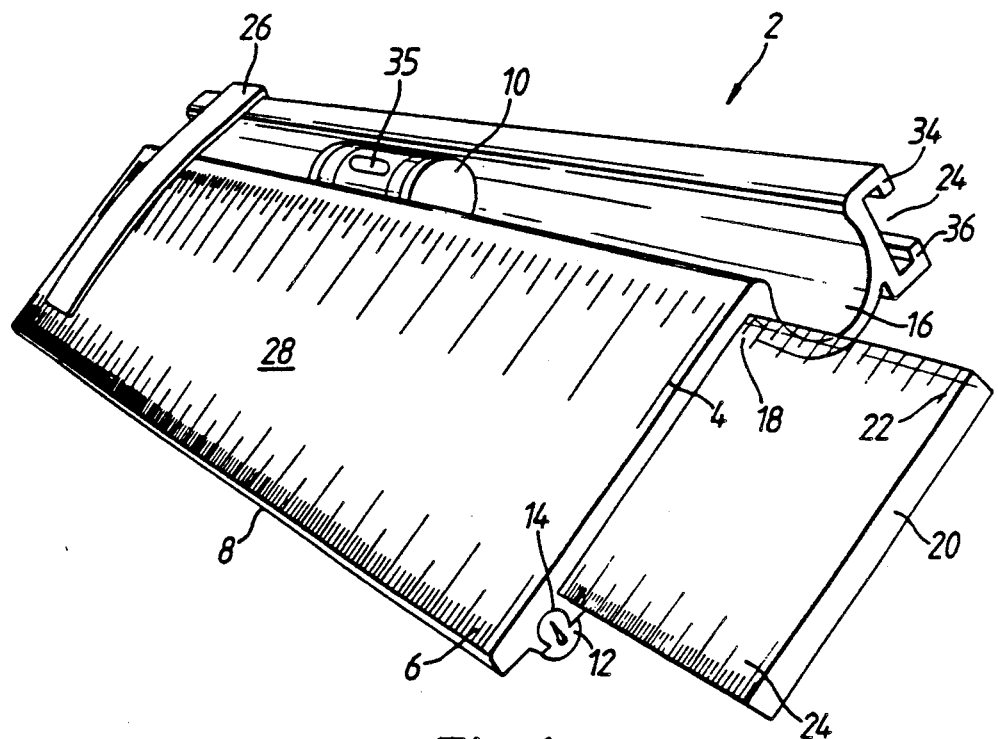
FIG. 1 is a perspective view of first measuring apparatus.
Figure 2:
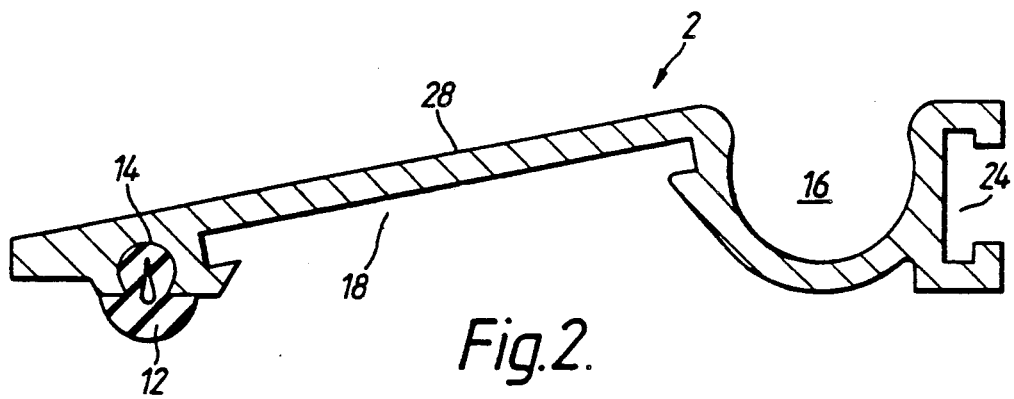
FIG. 2 is a section through part of the first measuring apparatus.

Referring to FIGS. 1 and 2 there is shown first measuring apparatus 2 having two measuring scales 4, 6 for effecting measurements. The measuring apparatus 2 also has a straight edge 8 for marking straight lines, and a spirit level in the form of a spirit level vial 10 for testing for horizontality. The measuring apparatus 2 further comprises friction creating means in the form of a strip 12 of resilient material. The strip 12 of resilient material provides a grip for the measuring apparatus 2 on a surface (not shown) against which the measuring apparatus is to be used. The surface may be the surface of a wall, a desk or any other desired object.

The measuring apparatus 2 has a first channel 14 into which the strip 12 fits. The first channel 14 extends the entire length of the measuring apparatus 2. The strip 12 extends along the entire length of the first channel 14.

The measuring apparatus 2 includes a second channel 16 into which the spirit level vial 10 fits. The second channel 16 extends the entire length of the measuring apparatus 2, whereby the second channel 16 is also available to accept writing instruments such for example as pencils. This provides a particularly useful feature when the measuring apparatus 2 is being held against a vertical or an inclined surface which would normally not retain writing instruments such as pencils. With the second channel 16, writing instruments can be placed in the channel so that they are always immediately available at exactly the required position for ease of use.

The measuring apparatus 2 includes a third channel 18 for receiving an extension rule 20. The third channel 18 extends the entire length of the measuring apparatus 2 so that the extension rule 18 can be slid outwards from either end of the third channel 18. The extension rule 20 has two sets of two measuring scales. The two measuring scales in each set are of the same measuring denomination. FIG. 1 shows one measuring scale 22 of one set and one measuring scale 24 of the other set. The measuring scales each start from a different end of the extension rule 20 and they each start at a zero reading at the ends of the extension rule 20. The measuring scales thus extend inwardly towards a middle portion of the extension rule 20 so that the extension rule 20 can be slid outwardly from either end of the measuring apparatus 2. In FIG. 1, the extension rule 20 is shown slid out from the right hand end of the measuring apparatus 2.

The measuring apparatus 2 includes a fourth channel 24 in which a cursor 26 slides. The cursor 26 is advantageous in enabling equivalent measurements between the two measuring scales 4, 6 easily and quickly to be determined.

The measuring apparatus 2 has an extruded body portion 28 which is made of aluminium. The body portion 28 is thus both light and rigid. The measuring scales 4, 6 are printed on the body portion 28 but they may be provided in any other desired manner for example by stick-on scales if desired. The extension rule 20 is preferably made from the same material and in the same manner as the body portion 28 but the extension rule 20 may be made from other materials and in different ways if desired.

Figure 3:
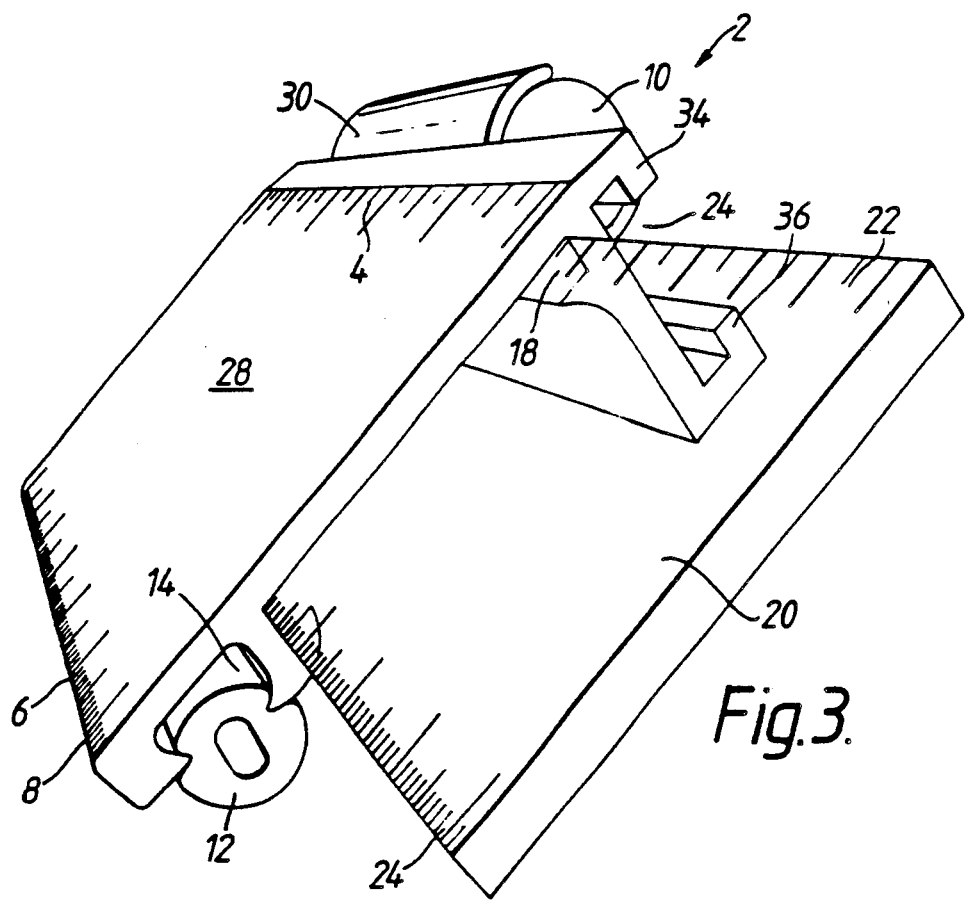
FIG. 3 is a perspective view of second measuring apparatus.

FIG. 3 shows second measuring apparatus 2. Similar parts as in FIGS. 1 and 2 have been given the same reference numerals and their precise construction and operation will not again be given. As can be seen from FIG. 3, the spirit level vial 10 is retained in a separate spirit level vial holder 30. The body portion 28 shown in FIG. 3 has a different cross sectional profile from that shown in FIG. 1.

Figure 4:
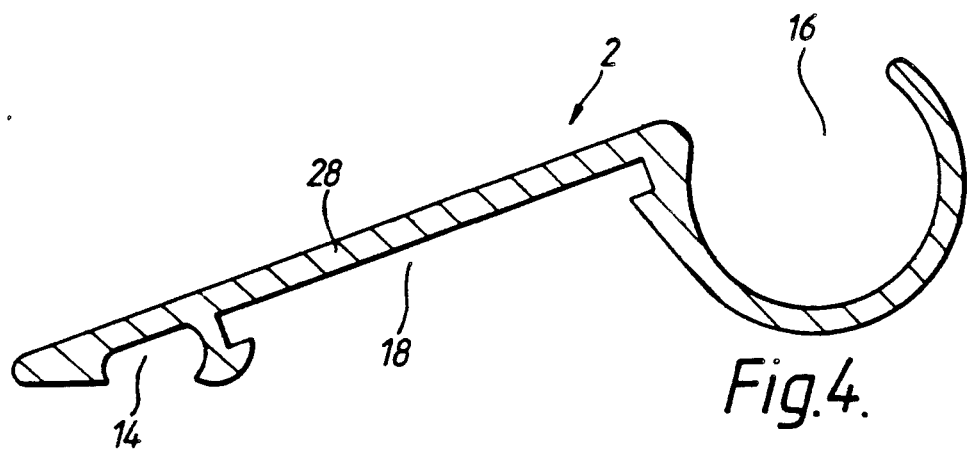
FIG. 4 is a cross section through third measuring apparatus.

FIG. 4 shows a body portion 28 having yet another cross sectional shape. Similar parts as in previous Figures have been given the same reference numerals.

Figure 5:
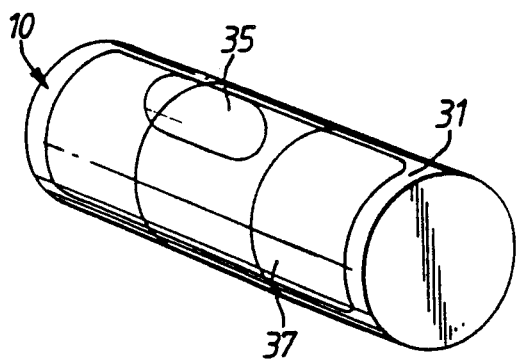
FIG. 5 shows a spirit level vial.

FIG. 5 shows the spirit level vial 10. The vial 10 has a container portion 31, a liquid 33 and a bubble 35 which is viewable through a window 37.

Figure 7:
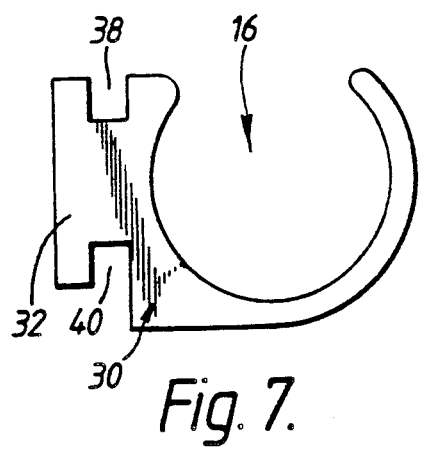
FIG. 7 is an end view of the spirit level vial holder shown in FIG. 6.
Figure 8:
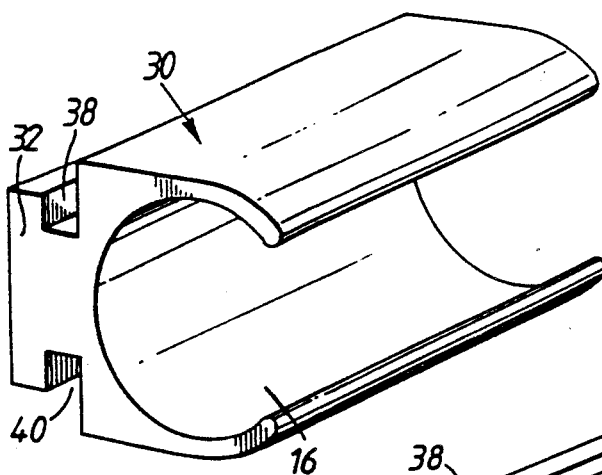
FIG. 8 is a perspective view of an alternative spirit level vial holder.
Figure 6:
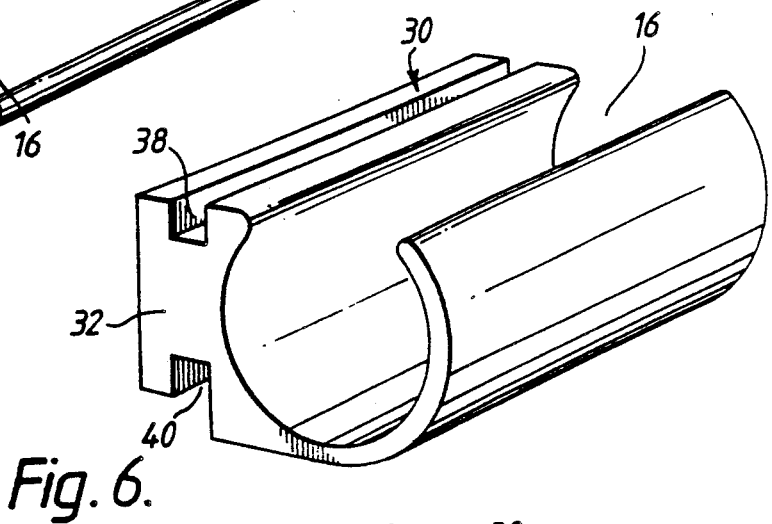
FIG. 6 is a perspective view of a separate spirit level vial holder.

FIG. 8 shows more clearly the holder 30 used in FIG. 3, whilst FIGS. 6 and 7 show an alternative holder 30. The holders 30 are such that they each have a portion 32 which slides in the fourth channel 24. The fourth channel 24 is defined by lips 34, 36, and these lips 34, 36 slide in grooves 38, 40 in the holder 30.

Figures 9, 10:
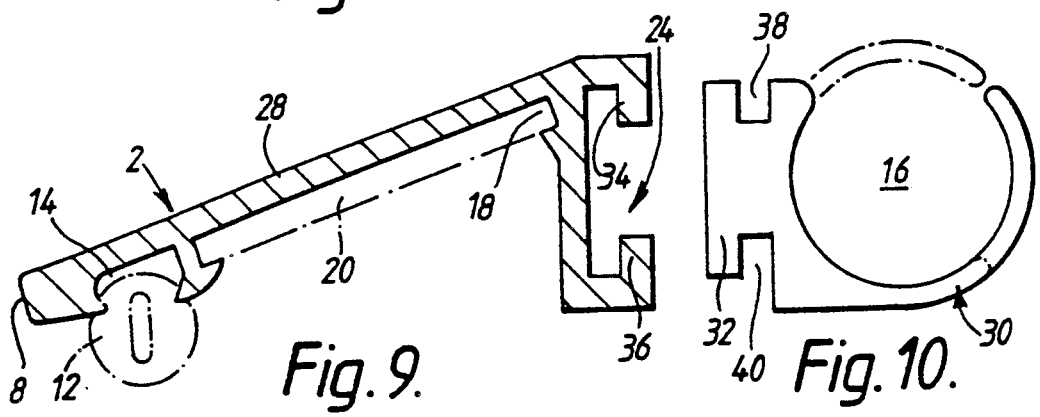
FIG. 9 is an end view of fourth measuring apparatus.
FIG. 10 is an end view of a spirit level vial holder and shows how its fits to the apparatus shown in FIG. 9.

FIGS. 9 and 10 show respectively a cross section through measuring apparatus 2 and an end view of a holder 30 which is like the holders 30 shown in FIGS. 6 to 8. FIGS. 9 and 10 illustrate how the holder can be inserted into the fourth channel 24.

FIGS. 11 and 12 show an angular member 42 which is provided with a portion 32 and grooves 38, 40 like those on the holder 30. The angular member 42 can thus be inserted into the fourth channel 24 as a sliding fit. The angular member 42 is provided with an angular scale 44 for effecting angular measurements. The angular member 42 is also provided with a spirit level vial 10.

FIG. 13 illustrates the measuring scales 4, 6 on the body portion 28.

Figure 14:
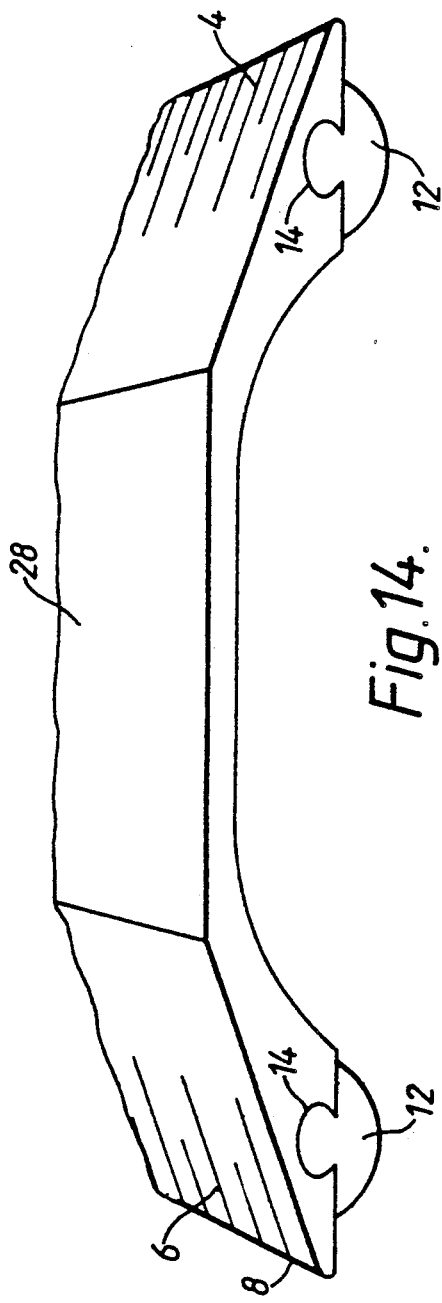
FIG. 14 shows an alternative cross sectional profile for part of the measuring apparatus.

FIG. 14 illustrates an alternative cross sectional shape for the body portion 28. In FIG. 14 it will be seen that there are two strips 12 located along both longitudinal edges of the body portion 28.

Figure 15:
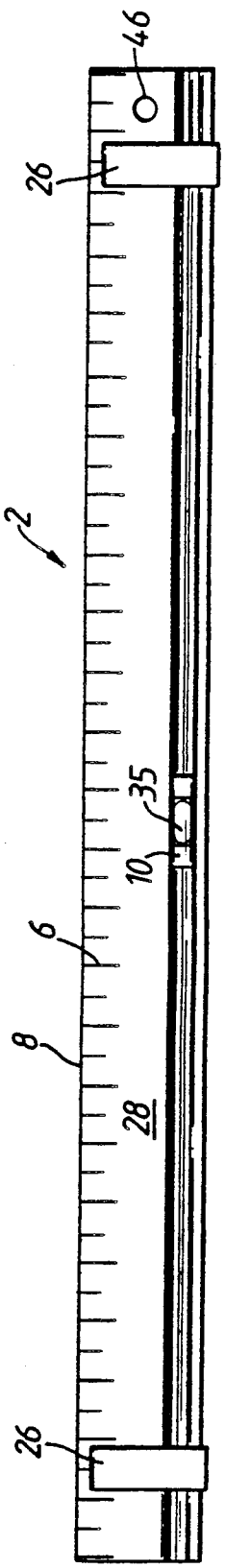
FIG. 15 is a plan view showing measuring apparatus with two cursors.

FIG. 15 is a top view illustrating measuring apparatus 2 provided with two cursors 26.

It is to be appreciated that the embodiments of the invention described above with reference to the accompanying drawings have been given by way of example only and that modifications may be effected. Thus, for example, the body portion 28 may be made from a plastics material instead of aluminium. Other metals can also be employed. The body portion 28 may be made by other than extrusion. Other cross sectional shapes may be employed for the strip 12. The strip 12 is preferably made from rubber or a plastics material.

With the angular member 42, the spirit level vial 10 preferably revolves angularly with respect to the angular scale 44, with the scale 44 having the degrees of a circle marked on it. Other cross sectional shapes for the various illustrated channels may also be employed. The measuring apparatus 2 may be made in various sizes and the body portion 28 may be made in two, three or more pieces. The cursors 26 can be differently shaped, for example with pointed ends. Also, the body portion can be provided with a hole 46 from which to hang the measuring apparatus. Advertising or other data may be provided on the measuring apparatus, for example on the body portion 28.

I claim:

1. Measuring apparatus comprising in combination:
   (a) a first side from which measurements are effected;
   (b) a second side for engaging a surface to be measured;
   (c) at least one measuring scale which is provided on the first side and which is for effecting measurements;
   (d) a straight edge for marking lines;
   (e) a first channel which is open along the second side and which extends the entire length of the measuring apparatus;
   (f) a friction-creating strip of resilient material which is positioned in the first channel and which is for providing a grip for the measuring apparatus on the surface to be measured;
   (g) a second channel which is open along the first side and which extends the entire length of the measuring apparatus; and
   (h) a spirit level which is provided in the second channel and which is for testing for horizontality, the spirit level being substantially shorter than the length of the second channel so that the second channel is also available for accepting writing instruments.

2. Measuring apparatus according to claim 1 and including a third channel which is open along the second side and which extends the entire length of the measuring apparatus, and an extension rule which is positioned in the third channel.

3. Measuring apparatus according to claim 2 in which the extension rule has at least two measuring scales, the two measuring scales being in the same measuring denomination, the two measuring scales each starting from a different end of the extension rule, and the two measuring scales each starting at a zero reading at the ends of the extension rule and extending inwards for measurements whereby the extension rule can be used from either end of the measuring apparatus.

4. Measuring apparatus according to claim 2 and including a fourth channel and a cursor in the fourth channel, the fourth channel being such that it is adjacent the second channel but is open along an edge of the measuring apparatus.

5. Measuring apparatus according to claim 4 and including two of the cursors.

6. Measuring apparatus according to claim 4 in which the first, second, third and fourth channels are all formed in an extruded body portion.

7. Measuring apparatus according to claim 6 and including a hole at one end of the body portion, the hole enabling the measuring apparatus to be hung when not in use and also to be hung against the surface to be measured for vertical plumb measuring.

8. Measuring apparatus according to claim 1 wherein the spirit level is tubular having a cross-sectional configuration substantially identical to the second channel, and is received directly in the second channel.

* * * * *